United States Patent [19]

Nicol

[11] Patent Number: 4,528,593
[45] Date of Patent: Jul. 9, 1985

[54] VISUAL SENSOR SYSTEMS

[76] Inventor: James C. B. Nicol, 23 Craighead Rd., Bishopton, Renfrewshire, Scotland

[21] Appl. No.: 436,037

[22] Filed: Oct. 22, 1982

[30] Foreign Application Priority Data

Oct. 23, 1984 [GB] United Kingdom ............... 8132094

[51] Int. Cl.³ .................... H04N 3/02; H04N 7/18; H04N 1/04; H04N 1/10
[52] U.S. Cl. ............................... 358/200; 358/106; 358/285; 358/293
[58] Field of Search ............... 358/200, 293, 294, 901, 358/285, 292, 101, 106

[56] References Cited

U.S. PATENT DOCUMENTS

| Re. 21,105 | 5/1939 | Round | 358/200 |
| 3,240,106 | 3/1966 | Hicks, Jr. | 358/200 |
| 3,249,692 | 5/1966 | Clay et al. | 358/200 |
| 3,739,095 | 6/1973 | Alden | 358/285 |
| 3,786,181 | 1/1974 | Pear, Jr. | 358/294 |
| 3,899,035 | 8/1975 | Rothgordt | 358/285 |
| 4,338,626 | 7/1982 | Lemelson | 358/106 |
| 4,364,113 | 12/1982 | Sengebusch et al. | 358/106 |
| 4,378,494 | 3/1983 | Miller | 358/106 |
| 4,484,081 | 11/1984 | Cornyn, Jr. et al. | 358/106 |

Primary Examiner—Howard W. Britton
Assistant Examiner—John K. Peng
Attorney, Agent, or Firm—Bell, Seltzer, Park & Gibson

[57] ABSTRACT

A visual sensor system (10) which provides computer-compatible data representative of an object (12) comprises means (13) (which may be a lens) providing a focal surface (14) having a predetermined spatial shape, a bundle (16) of radiation guide members (such as optical fibers) interconnecting a receptor surface (15) and a delivery surface (17), and an opto-mechanical scan device (18) arranged to scan a predetermined scan surface. The receptor surface (15) is physically located at and arranged to conform with the focal surface (14) and the delivery surface (17) is physically located at and arranged to conform with the scan surface. Computer-compatible data is effected by the presence at the delivery surface (17) of discrete radiation guide member ends which provide discrete radiation packages to the probe of the scan device (18).

6 Claims, 6 Drawing Figures

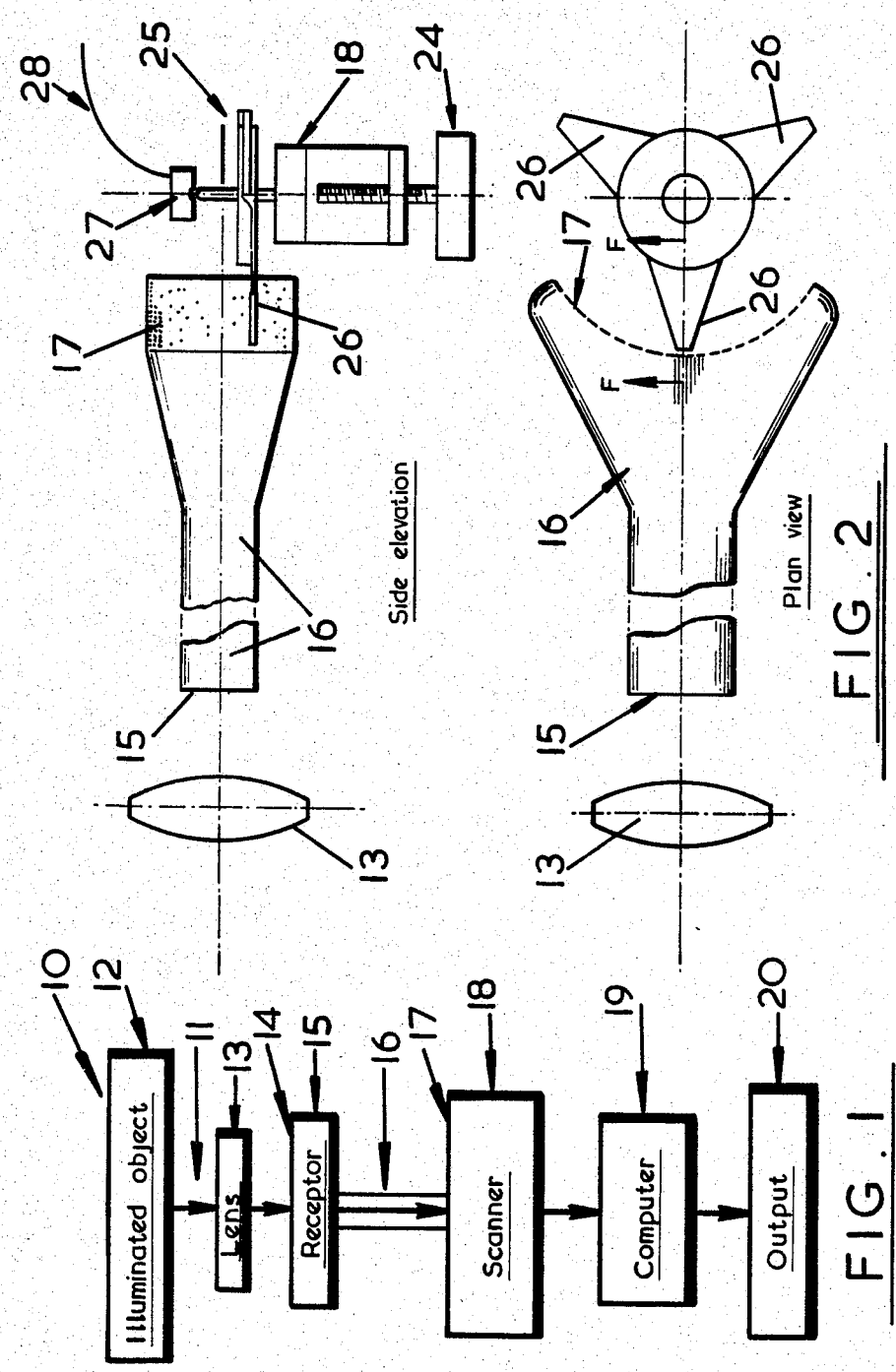

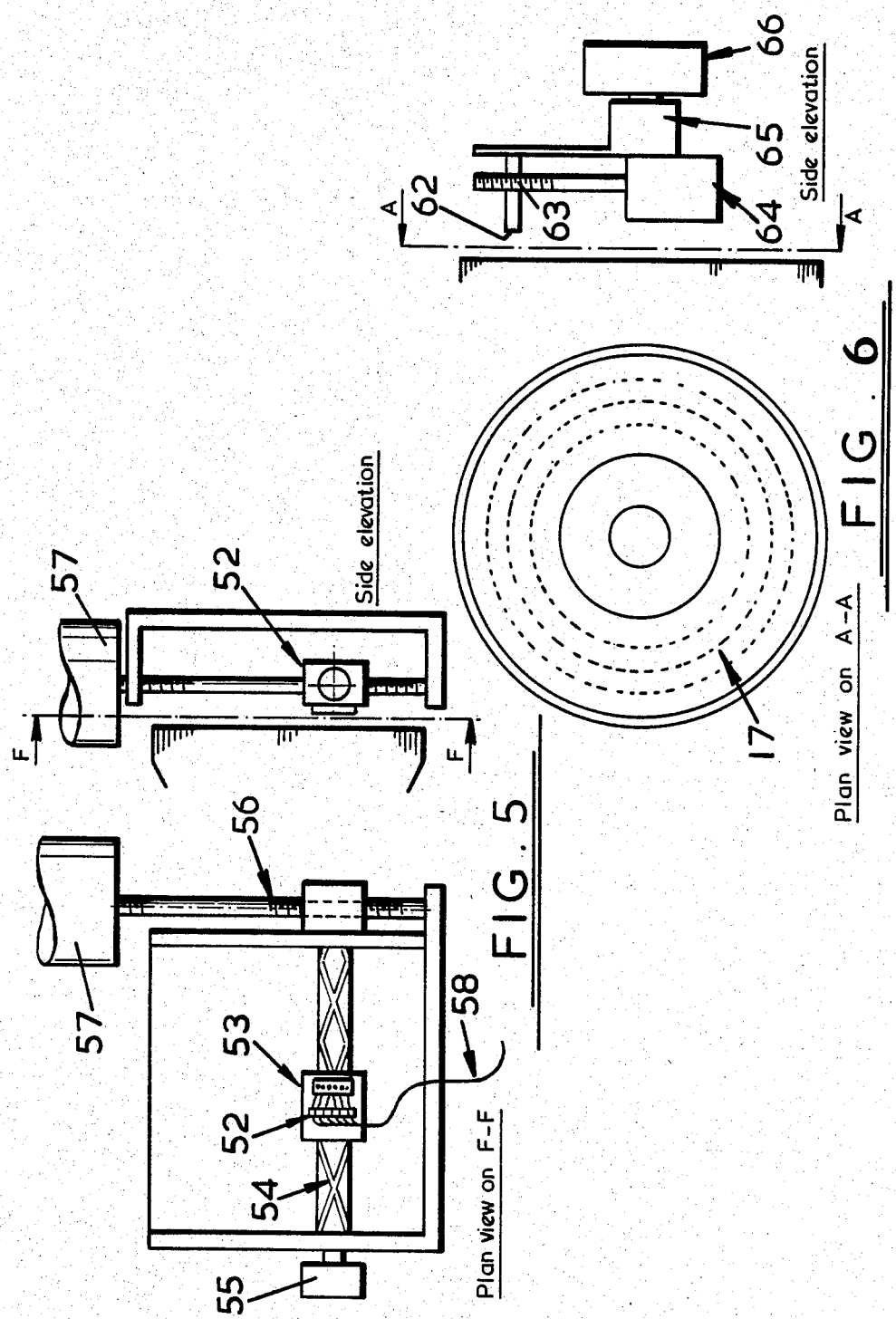

VISUAL SENSOR SYSTEMS

This invention relates to visual sensor systems.

Almost all known forms of visual sensor systems use a TV type camera to view the object concerned and a digitiser is provided to provide a signal from the camera which is in digital form and is compatible with a computer or microprocessor. In an industrial environment the known systems have two principal disadvantages. Firstly they are costly and secondly the electron beam deflection of the TV camera which achieves a scanning function is prone to interference problems so that good reliability is difficult to achieve. For these reasons such systems have not been widely adopted in manufacturing industry. Solid state electronic scan systems have been the objective of much research work in recent years but only limited results have been achieved which for a visual sensor system would provide inadequate resolution for all but the simplest of tasks.

It is an object of the present invention to provide a new and improved form of visual sensor system which is relatively cheap to manufacture, which does not rely upon sophisticated technology, and which provides adequate resolution for most industrial tasks.

According to the present invention there is provided a visual sensor system providing computer-compatible data representative of an object comprises means for delivering image-forming radiation from the object to a focal surface the spatial shape of which focal surface is determined by said means, an ordered bundle of radiation guide members interconnecting a receptor surface and a delivery surface, said receptor surface being located at and physically conforming with the spatial shape of said focal surface, and an opto-mechanical radiation scan device located adjacent said delivery surface, said scan device comprising a radiation detector probe which is movable in a predetermined manner over a predetermined scan surface the spatial shape of which scan surface is determined by said scan device, said delivery surface being located at and physically conforming with the spatial shape of said scan surface, and wherein said probe provides computer-compatible data by virtue of the presence at the delivery surface of discrete radiation guide member ends which provide discrete radiation packages to said probe.

The system may be arranged to handle radiation in the visible or infrared or even at other wavelengths and it will be evident that the components of the system are manufactured from materials compatible with the wavelength or band of wavelengths of interest.

The focal surface may be planar or curved but in any event is shaped by the means which deliver the image-forming radiation from the object and is thereby dependent upon the characteristics thereof. The receptor surface forms one end of an ordered bundle of radiation guide members and since the bundle is 'ordered' the succession of ends of the guide members is predetermined at the delivery surface. This predetermined order may be such that the ends are identically disposed at the receptor and delivery surfaces but this need not be the case. The ends at the delivery surface could be arranged in a different manner from those at the receptor surface but compatible with the operation of the scan device. The scan device may take any convenient opto-mechanical form and determines the shape of the scan surface which may be planar, cylindrical or spherical for example.

Embodiments of the present invention will now be described by way of example with reference to the accompanying drawings in which:

FIG. 1 is a flow chart illustrating a radiation scan system according to the present invention;

FIG. 2 shows plan and elevational views of a first embodiment of part of the system;

FIG. 5 shows plan and elevational views of a fourth embodiment of part of the system; and FIG. 6 shows plan and elevational views of a fifth embodiment of part of the system.

Figures 3, 4:
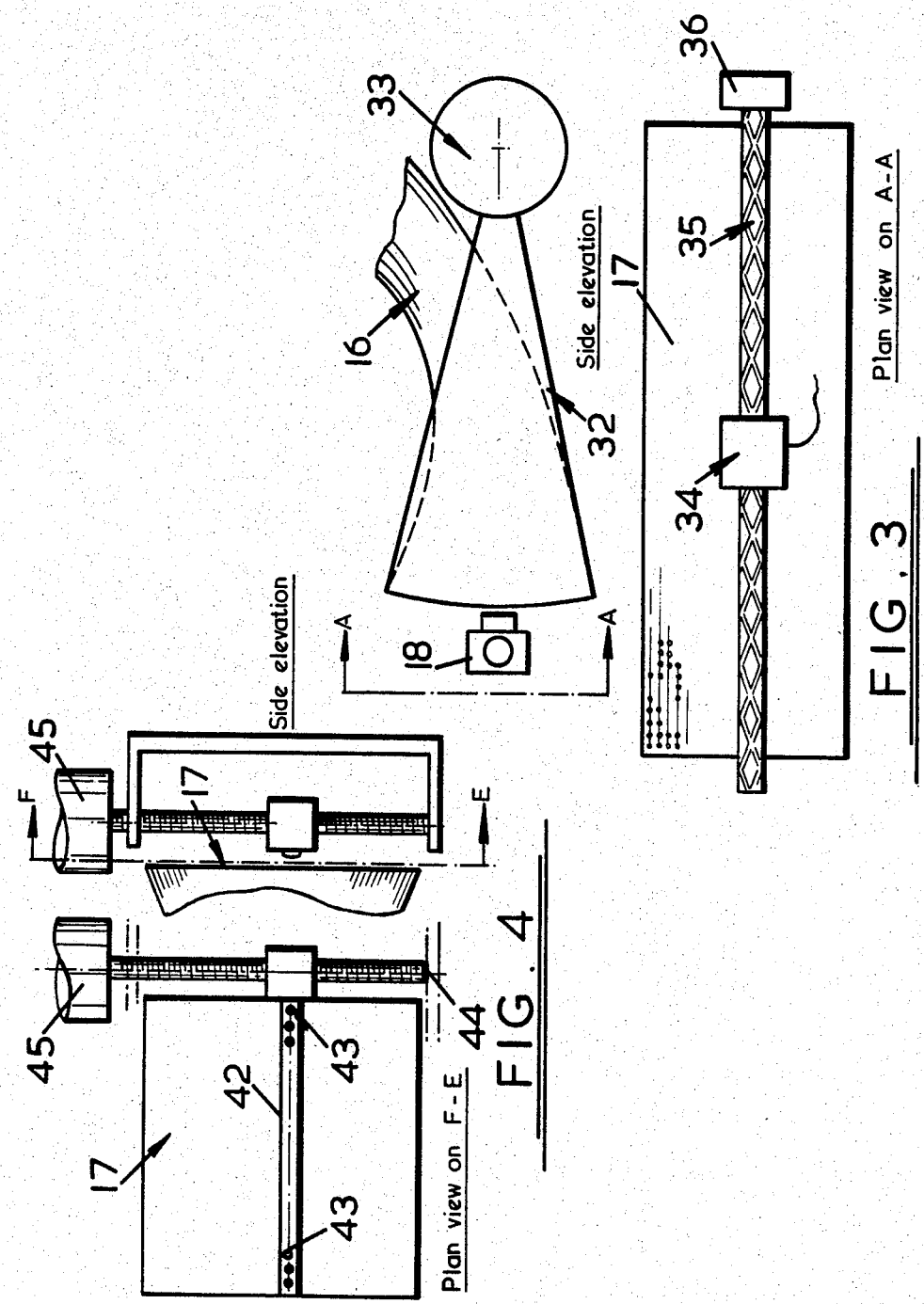
FIG. 3 shows plan and elevational views of a second embodiment of part of the system.
FIG. 4 shows plan and elevational views of a third embodiment of part of the system.

In the visual sensor system 10 shown in FIG. 1 radiation 11 from an illuminated object 12 is collected by a lens 13 which delivers image-forming light radiation to a focal surface 14 at which there is located a receptor surface 15. Surface 15 forms one end of a fibre bundle 16 formed by a plurality of individual optical fibres, the other end of the bundle 16 forming a delivery surface 17 at which there is located an opto-mechanical scan device 18. The output from the scan device 18 in the form of a computer-compatible data stream, preferably serialised, is delivered to a computer 19 having an output device 20 associated therewith. The data-stream is computer-compatible because of the presence at delivery surface 17 of individual fibre ends which thereby provide discrete radiation packages to the scan device 18.

By way of example, in a production monitoring apparatus, object 12 may be one of a series of manufactured products intended to be identical, and computer 19 may incorporate in one of its internal memories the scan pattern produced by a standard product, the output device 20 being driven by the computer 19 to indicate the disparities of sequentially presented objects 12 in relation to the standard as a result of which the manufacturing process may be adjusted to reduce or eliminate these disparities. In a further example the object 12 may be an information sheet or carrier in which case the computer 19 is used to store the information since the remainder of the system 10 effectively digitises the information into a form suitable for computer storage, output device 20 being a convenient means of providing a visual display.

In the embodiment of FIG. 2 the bundle 16 is formed so that receptor surface 15 is planar and rectangular in end view whereas the delivery surface 17 is concave cylindrical but in end view is also rectangular but larger than that for surface 15. The scan device 18 comprises a stepping motor 24 rotationally driving a head 25 incorporating a probe 26 in the form of a single optical fibre which co-operates with a photo-cell device 27 the electrical output signal from which is delivered to lead 28. In the illustrated arrangement there are three probes 26 to provide mechanical balance for the head 25 and also to treble the scan rate. Head 25 (which includes the photo cell device 27) is also indexed axially after each revolution by the motor 24. Since surface 17 is physically larger than surface 15 it will be evident that the fibre ends will be physically spaced apart to a greater extent at surface 17 than at surface 15 so that althouth the optical resolution is determined by surface 15 the scan device 18 is of substantially less resolution.

The embodiment of FIG. 3 illustrates an arrangement where the fibre bundle 16 is sufficiently flexible that the ends forming the delivery surface 17 are secured to a movable carrier 32 driven by a stepping motor 33 to define a first direction of scan whilst the scan device 18 comprises a head 34 linearly movable in either direction along a shaft 35 driven by a further motor 36 and thereby provides a second direction of scan. In this case the delivery surface 17 is rectangular in end view and convex cylindrical.

The FIG. 4 embodiment utilises a scan device 18 having a head 42 incorporating a row of photo-electric devices 43, the head 42 being movable linearly on shaft 44 by motor 45. In this case the delivery surface 17 is planar and square in end view.

In the FIG. 5 embodiment the scan device 18 has a head 52 with a column of photo-electric devices 53, the head 52 being movable along a shaft 54 by means of a shaft rotation motor 55; and the shaft 54 and motor 55 being movable by means of lead screw 56 driven by a further motor 57. It will be noted that in this embodiment the data stream on lead 58 is in parallel from the various devices 53 on head 52.

The FIG. 6 embodiment provides a planar delivery surface 17 circular in end view and the scan device 18 comprises a probe 62 movable along shaft 63 by means of motor 64 the whole being rotatable by spindle 65 driven by a further motor 66.

It will now be appreciated that various formats are possible for the receptor and delivery surfaces 15, 17 of the bundle 16 these being selected to suit the characteristics of the image-forming means 12 and the scan device 18 and additionally to provide the resolution and scan speeds required. Furthermore, although the bundle 16 has been described as being composed of individual fibres these could be organised in the form of ribbons which are easier to handle than individual fibres per se. A fibre ribbon is of course already known and comprises a group of fibres arranged side-by-side in a row. With this arrangement the 'ordering' referred to previously comprises arranging the ribbons in a first format at the receptor surface 15 and in a second format at the delivery surface 17. By way of example, at the receptor surface 15 the rows may be very close together and providing a rectangular fibre-end array which is elongated in the direction of a row whereas at the delivery end 17 the rows may be spaced apart to provide a rectangular fibre-end array which is elongated transversely to the row direction. Alternatively the rows at the receptor surface 15 may be stacked to form a rectangular array whereas the rows at the delivery surface 17 may be side-by-side to provide a columnar array.

It will be evident from the foregoing that the means providing the image-forming radiation at the focal surface may be an optical arrangement such as a lens but of course the object itself may provide the focal surface directly as a consequence of illumination thereon in which case the receptor surface 15 requires to conform to the physical shape of the object.

What is claimed is:

1. Production monitoring apparatus for use with a process in which a series of products intended to be identical are manufactured, said apparatus comprising a visual sensor system for viewing and providing computer-compatible scan-pattern data representative of products of said series sequentially presented to said visual sensor system, computer means connected to said visual sensor system to receive therefrom said computer-compatible scan pattern data, said computer means incorporating a memory pre-programmed with a predetermined scan pattern representative of a standard product and being associated with an output device arranged to indicate the disparities of sequentially-presented products in relation to said standard for adjusting the manufacturing process to reduce or eliminate said disparities, said visual sensor system comprising means for delivering image-forming radiation from a said product to a focal surface remote from said product the spatial shape of which focal surface is determined by said means, an ordered bundle of radiation guide members interconnecting a receptor surface and a delivery surface, said receptor surface being located at and physically conforming with the spatial shape of said focal surface, and an opto-mechanical radiation scan device located adjacent said delivery surface, said scan device comprising a radiation detector probe which is movable in a predetermined scan surface the spatial shape of which scan surface is determined by said scan device, said delivery surface being located at and physically conforming with the spatial shape of said scan surface, and wherein said probe provides said computer-compatible data by virtue of the presence at the delivery surface of discrete radiation guide member ends which provide discrete radiation packages to said probe.

2. A system as claimed in claim 1, wherein the spacing between the ends of the guide members at the delivery end of said bundle is greater than that at the receptor end of said bundle.

3. A system as claimed in claim 1, wherein the bundle is composed of guide members formed as ribbons and the spacing between the ribbons at the delivery end of the bundle is greater than that at the receptor end of said bundle.

4. A system as claimed in claim 1, wherein said scan device provides two orthogonal scan directions.

5. A system as claimed in claim 1, wherein said scan device provides a single scan direction and said delivery surface of said bundle is arranged to provide an orthogonal scan direction.

6. A system as claimed in claim 5, wherein said orthogonal scan direction is provided by the physical orientation of the fibres at said delivery surface, the bundle being stationary.

* * * * *